US 6,595,413 B1

(12) United States Patent
Sugita (10) Patent No.: US 6,595,413 B1
(45) Date of Patent: Jul. 22, 2003

(54) DISPLAY DEVICE FOR ALTERNATELY DISPLAYING BALANCE DATA AND HISTORICAL DATA READ FROM AN IC CARD

(75) Inventor: Kazunari Sugita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 745 days.

(21) Appl. No.: 08/913,282

(22) PCT Filed: Dec. 27, 1996

(86) PCT No.: PCT/JP96/03841

§ 371 (c)(1),
(2), (4) Date: Sep. 11, 1997

(87) PCT Pub. No.: WO97/25687

PCT Pub. Date: Jul. 17, 1997

(30) Foreign Application Priority Data

Jan. 11, 1996 (JP) ............................................. 8-003333

(51) Int. Cl.[7] .................................................. G06K 5/00
(52) U.S. Cl. ....................................... 235/380; 235/441
(58) Field of Search ................................. 235/375, 379, 235/380, 385, 441, 451, 486, 492, 382; 902/26; 705/17, 24, 41

(56) References Cited

U.S. PATENT DOCUMENTS

| 4,454,414 A | * | 6/1984 | Benton ........................ 235/379 |
| 4,705,211 A | * | 11/1987 | Honda et al. ................ 235/380 |
| 5,144,115 A | * | 9/1992 | Yoshida ........................ 235/379 |
| 5,221,838 A | * | 6/1993 | Gutman et al. .............. 235/379 |
| 5,272,319 A | * | 12/1993 | Rey ............................. 235/379 |
| 5,478,996 A | * | 12/1995 | Muto et al. .................. 235/441 |
| 5,517,011 A | | 5/1996 | Vandenengel ................ 235/441 |
| 5,521,362 A | * | 5/1996 | Powers ........................ 235/380 |
| 5,521,363 A | * | 5/1996 | Tannenbaum ................ 235/379 |
| 5,590,038 A | * | 12/1996 | Pitroda .................... 235/380 X |
| 5,686,714 A | * | 11/1997 | Abe et al. ............... 235/441 X |
| 5,748,737 A | * | 5/1998 | Daggar .................... 235/379 X |
| 6,003,762 A | * | 12/1999 | Hayashida ................... 235/379 |
| 6,016,954 A | * | 1/2000 | Abe et al. .................... 235/379 |
| 6,016,957 A | * | 1/2000 | Ohki et al. ................. 235/380 |
| 6,237,848 B1 | * | 5/2001 | Everett ....................... 235/380 |
| 6,431,441 B1 | * | 8/2002 | Franchi ...................... 235/380 |

FOREIGN PATENT DOCUMENTS

| JP | 57-185558 | | 11/1982 |
| JP | 61-138390 | | 6/1986 |
| JP | 01-002094 | | 1/1989 |
| JP | 01-024295 | | 1/1989 |
| JP | 07-507896 | | 8/1995 |
| JP | 08-77304 | | 3/1996 |
| JP | 08-279026 | | 10/1996 |
| JP | 9-293110 A | * | 11/1997 |
| WO | 96/07160 | | 3/1996 |

* cited by examiner

Primary Examiner—Jared Fureman
(74) Attorney, Agent, or Firm—Rabin & Berdo, P.C.

(57) ABSTRACT

A display device (1) having a portable card detection sensor (4c) for detecting mounting and removal of an IC card (7), and a controller (5) capable of reading out balance data and historical data of transaction from the IC card (7) upon detection by the card detection sensor (4c) of the mounting of the IC card (7), and displaying the respective data alternately on a display window (2). The mounting of the IC card (7) is detected by the card detection sensor (4c) simply by mounting the IC card (7) in the display device (1), and the balance data and historical data of transaction are read out from the IC card (7) and displayed alternately on the display window (2) by the controller (5).

4 Claims, 11 Drawing Sheets

DISPLAY DEVICE FOR ALTERNATELY DISPLAYING BALANCE DATA AND HISTORICAL DATA READ FROM AN IC CARD

TECHNICAL FIELD

The present invention relates to a display device for reading an IC card and displaying a readout.

BACKGROUND TECHNOLOGY

When one does his or her shopping using, for example, an IC card in which data representing an amount prepaid (hereinafter referred to as electronic money) are stored, the electronic money equivalent to an amount of a purchase is to be drawn out from the IC card. In such a case, however, a bearer of the IC card needs to check an amount of the balance left in the IC card. Accordingly, the bearer of the IC card had to check the amount of the balance left in the IC card in the past by mounting the IC card in the display device disclosed in U.S. Pat. No. 5,517,011, and in Japanese Patent Laid-open Publication No. Hei 08-077304 so that the display device can read out and display data on the balance stored in the IC card.

Since the conventional display device described above is required to be as small as possible in size from the viewpoint of portability, it has been desired that movable components such as a keyboard, and the like are omitted wherever possible.

Accordingly, in the conventional display device, functions other than a function for giving a readout of the balance in the IC card, including, for example, a function for displaying historical transaction data, that is, a function for checking whether or not the correct amount of a purchase has been drawn out when payment is made after shopping at a store, and a function for setting a password, are eliminated, leading to the elimination of the keyboard for selecting these functions. With the conventional display device described above without the benefits of the function for displaying the historical transaction data, the bearer of an IC card had to calculate an amount of electronic money to be transferred, corresponding to the price of a purchase made, by checking the balance in the IC card both before and after the transfer. As a result, the bearer of IC cards has found the conventional display device inconvenient for him to use.

SUMMARY OF THE INVENTION

The present invention has adopted the following constitution in order to solve the aforesaid problem.

A display device according to the invention comprises a card detection sensor for detecting mounting and removal of an IC card, and a controller for reading out data on the balance in the IC card and historical transaction data from the IC card as soon as the card detection sensor detects mounting of the IC card, and for displaying the respective data alternately on a display window.

The display device for the IC card constituted as described above is capable of detecting the mounting of the IC card by means of the card detection sensor as soon as the IC card is mounted in the display device, and of displaying alternately on the display window the data on the balance and the historical transaction data, which are read out from the IC card by means of the controller.

BEST MODE FOR CARRYING OUT THE INVENTION

Embodiments of the invention are described hereafter by way of example.

(Constitution)

Figure 1:
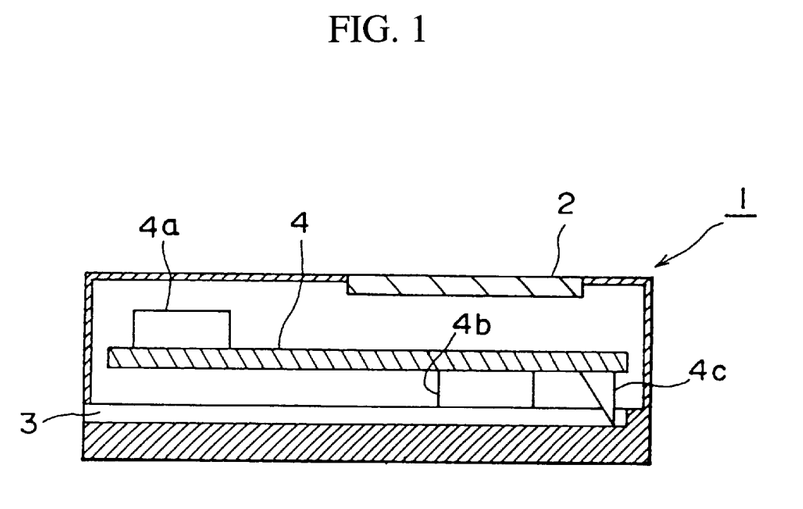
FIG. 1 is a schematic sectional view of an IC card reader according to an embodiment of the invention.
Figure 2:
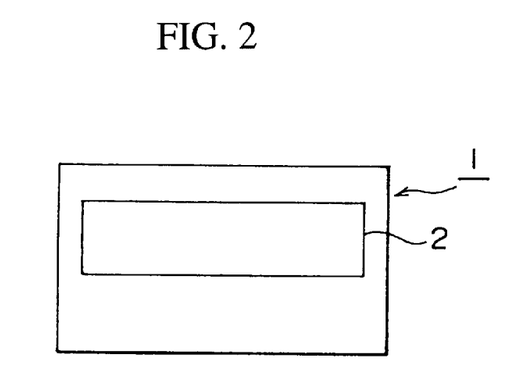
FIG. 2 is a top plan view showing a display window of the IC card reader according to the embodiment of the invention.
Figure 3:
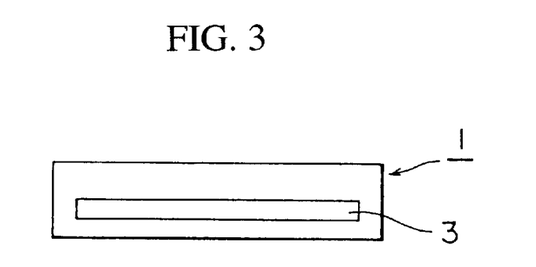
FIG. 3 is an illustrative view showing an insertion inlet for an IC card of the IC card reader according to the embodiment of the invention.
Figure 4:
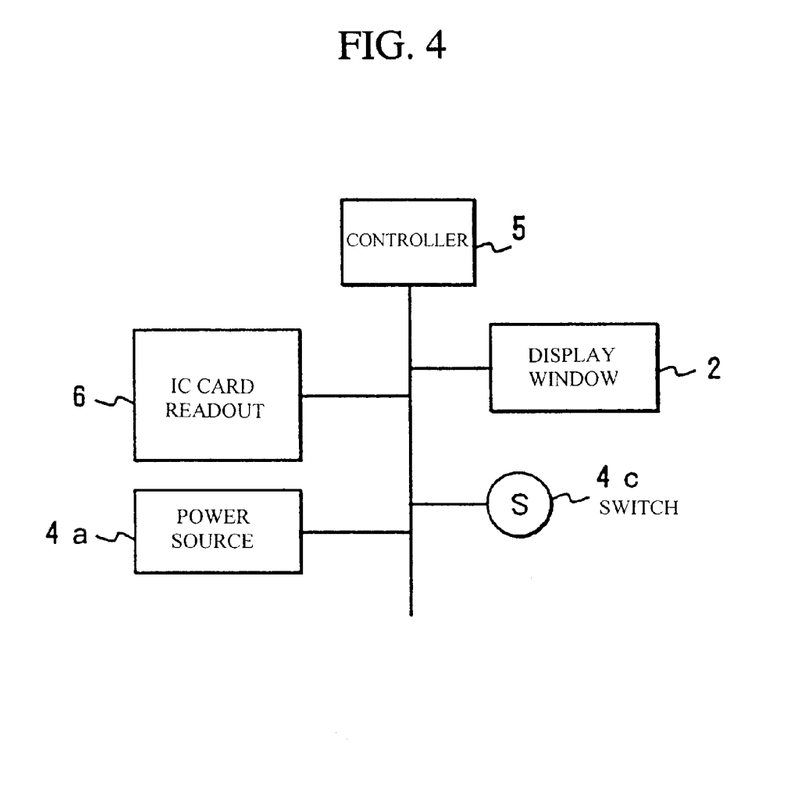
FIG. 4 is a block diagram of the IC card reader according to the embodiment of the invention.

The embodiments of the invention are described in detail hereafter with reference to the accompanying drawings. An IC card reader capable of reading and displaying data stored in a prepaid IC card is described as an example of the display device according to an embodiment of the invention. Components common among the various views are designated the same reference numerals. FIG. 1 is a schematic sectional view of the IC card reader according to the embodiment of the invention. FIG. 2 is a top plan view showing a display window of the IC card reader according to the embodiment of the invention, FIG. 3 an illustrative view showing an insertion inlet for an IC card of the IC card reader according to the embodiment of the invention, FIG. 4 a block diagram of the IC card reader according to the embodiment of the invention, and FIG. 5 a block diagram of the IC card.

The IC card reader 1 comprises a display window 2 provided on the upper surface thereof, an IC card insertion inlet 3 (hereinafter referred to as an insertion inlet 3) provided on one sidewall thereof, and a substrate 4 provided therein. As shown in FIG. 1, the substrate 4 is provided with a power source 4a, an IC card connector 4b (hereinafter referred to as a connector 4b) driven and controlled when the power source 4a is turned on, an IC card detection switch 4c (hereinafter referred to as a switch 4c) for detecting mounting and removal of an IC card 7, and a controller 5. The switch 4c is so disposed as to impinge on the front tip of the IC card 7 inserted into the IC card reader 1 through the insertion inlet 3 by a bearer of the IC card 7. Thus, when the bearer inserts the IC card 7 into the IC card reader 1, the switch 4c is pressed by the front tip of the IC card 7, turning on the power source 4a. The switch 4c need not be constituted as shown in FIG. 1 as long as the same is of a constitution enabling detection of mounting and removal of the IC card 7, and may be, for example, an optical sensor or a proximity switch, or the like. The controller 5 is connected to the display window 2, the power source 4a, the switch 4c, and an IC card readout 6, controlling overall operation of the IC card reader 1. Further, a timer (not shown) is incorporated in the controller 5.

Figure 5:
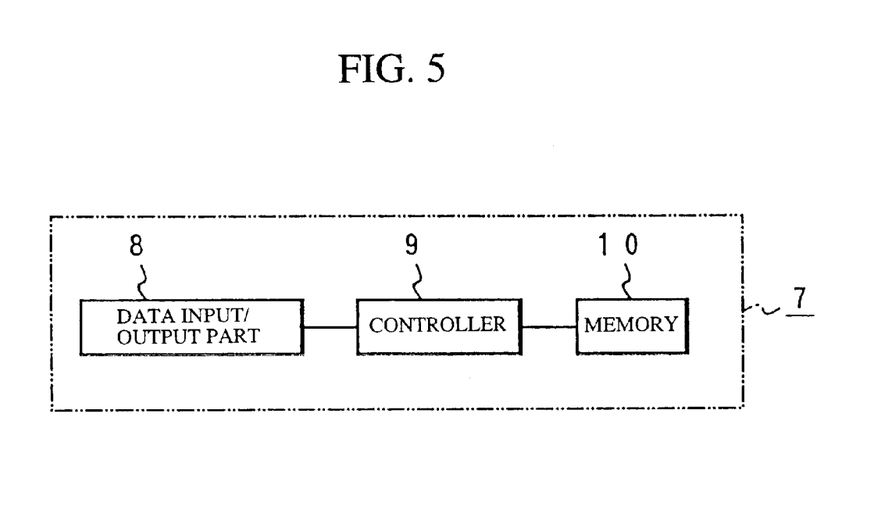
FIG. 5 is a block diagram of the IC card.

The IC card 7 is provided with a plurality of card terminals (not shown) exposed on the surface thereof. Signals are transmitted between the card terminals and the IC card reader 1 when the card terminals are brought into contact with the connector 4b of the IC card reader 1. As shown in FIG. 5, the IC card 7 incorporates a data input/output part 8 for performing transmission of signals to and from the IC card reader 1, a controller 9 for controlling overall operation of the IC card, and a nonvolatile memory 10 for storing programs and data. The data input/output part 8, the controller 9, and the memory 10 are connected to the card terminals by signal lines, enabling transmission of signals to and from the IC card reader 1 via the card terminals. The memory 10 stores data representing an amount money (hereinafter referred to as electronic money), balance data indicating an amount of the balance of the electronic money, and historical transaction data including times and dates of respective transactions, amounts of receipts and payments, names of goods purchased, and the like the results of respective transactions indicating whether or not each transaction has been performed properly, and the like. When the IC card 7 is removed from the IC card reader 1 by the bearer, the programs and data loaded in the IC card 7 are forcefully saved. However, a readout of an amount of the balance given hereupon by the IC card reader 1 does not represent that of the electronic money itself, but simply the balance data. Accordingly, the electronic money never vanishes.

(Operation)

Figure 6:
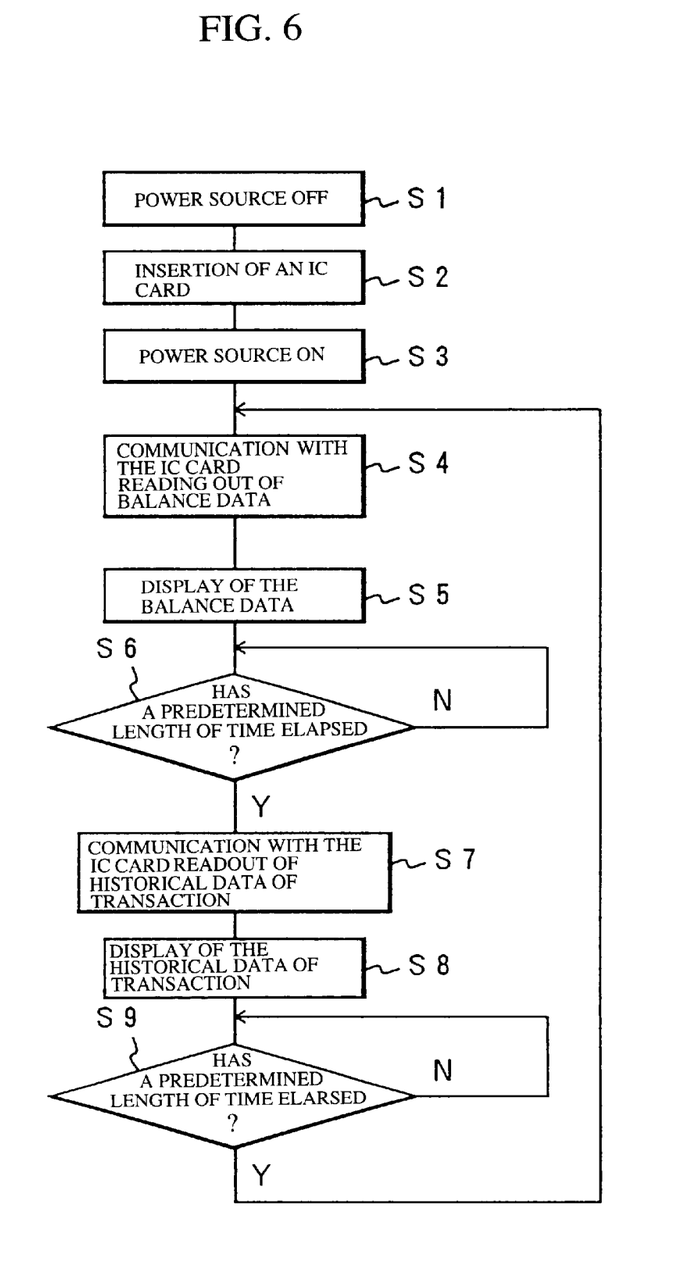
FIG. 6 is a flow chart of the IC card reader according to the embodiment of the invention.

Hereafter, display operation of the IC card reader 1 is described in conjunction with the accompanying drawings. FIG. 6 is a flow chart showing the display operation pattern of the IC card reader 1. In the following flow charts, the IC card reader 1 displays a readout of both the balance data and the historical transaction data; however, the display operation pattern may be varied to display a readout of the historical data of transaction only.

In an operating condition where the IC card 7 is not inserted in the IC card reader 1 as yet, the power source is in off condition (step S1). When the bearer inserts (step S2) the IC card 7 into the insertion inlet 3 of the IC card reader 1, the front tip of the IC card 7 comes into impinging relationship with the internal wall of the switch 4c of the IC card reader 1, turning the switch 4c on. Hereupon, the card terminals of the IC card 7 are in contact with the connector 4b of the IC card reader 1. The controller 5 of the IC card reader 1, upon detecting that the switch 4c is on, decides that the insertion of the IC card 7 is completed (mounting of the IC card 7 is completed), and turns the power source 4a on (step S3). Then, the controller 5 communicates with the IC card 7 by controlling the IC card readout 6, reads out (step S4) the balance data stored in the memory 10 of the IC card 7, and displays a readout of the balance data on the display window 2 (step S5).

When the controller 5, measuring a display time for the balance data by means of a built-in timer, decides (step S6) that the display time has elapsed for a predetermined length of time, the same communicates with the IC card 7 by controlling the IC card readout 6, reads out (step S7) the historical data of the last transaction among the historical data of all transactions stored in the memory 10 of the IC card 7, and displays (step S8) a readout of the historical data of the last transaction (for example, data on details and results of the last transaction) instead of the balance data on the display window 2. When the controller 5, measuring the display time for the historical data by means of the built-in timer, decides (step S9) that the display time has elapsed for a predetermined length of time, the steps of operation S4 and onwards as described above are performed. More specifically, the balance data stored in the memory 10 are again read out, and a readout of the balance data instead of the historical data of the last transaction is displayed on the display window 2. Thereafter, the controller 5 causes the IC card reader 1 to repeat the steps of operation from S4 to S9 until the IC card 7 is removed from the insertion inlet 3, displaying the balance data and the historical transaction data alternately on the display window 2.

When the bearer removes the IC card 7 from the insertion inlet 3 of the IC card reader 1, the switch 4c thereof is turned off, subsequently turning the power source 4a off.

Figure 7:
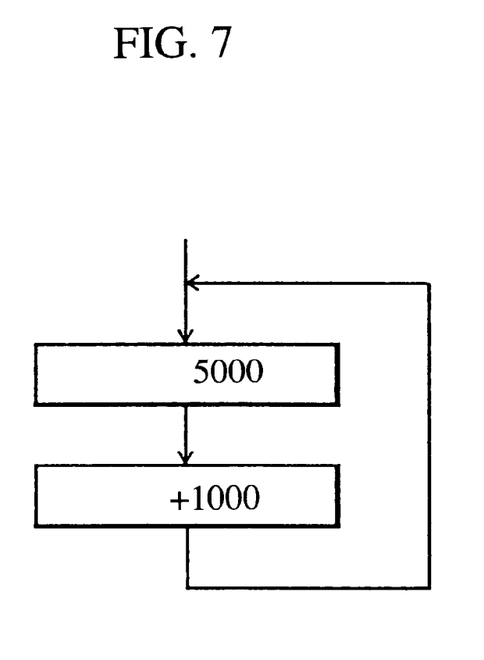
FIG. 7 is a view illustrating data displayed on the display window.
Figure 8:
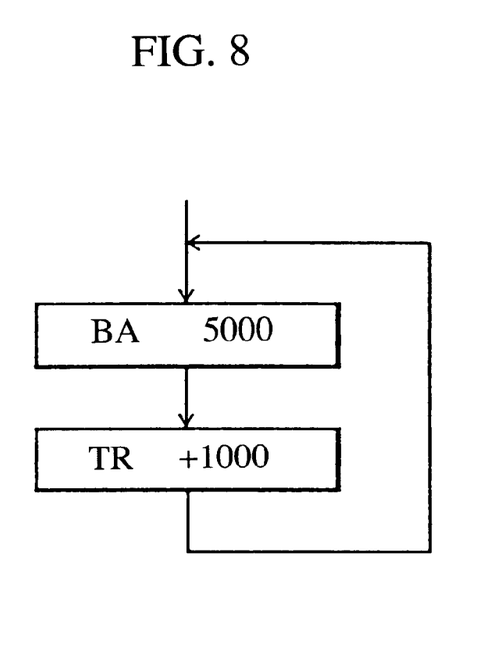
FIG. 8 is a view illustrating data displayed on the display window.

FIGS. 7 and 8 show an example of data displayed on the display window 2 in the course of the steps of operation from S4 to S9. These figures show views of data displayed on the display window 2 in case where the balance in the IC card 7 is 5000 yen and the historical data of the last transaction stored in the IC card 7 is 1000 yen paid in. In an example shown in FIG. 7, the IC card reader 1 displays first the balance data, "5000", and then the historical data of the last transaction, "+1000", on the display window 2, repeating such display operations. In an example shown in FIG. 8, the IC card reader 1 displays first the balance data, "BA 5000" (hereinafter BA refers to the balance data), and then the historical data of the last transaction, "TR+1000" (hereinafter TR refers to the historical data of the last transaction), on the display window 2, repeating such display operations.

In the present embodiment, the IC card reader 1 displays alternately the balance data and the historical data of the last transaction which are read out from the IC card 7. Consequently, the keyboard incorporating an operational key for selecting a function of displaying the historical transaction data, and the like can be eliminated from the IC card reader 1. As a result, the IC card reader 1 can be reduced in size and weight.

(Another Embodiment 1)

Figure 9:
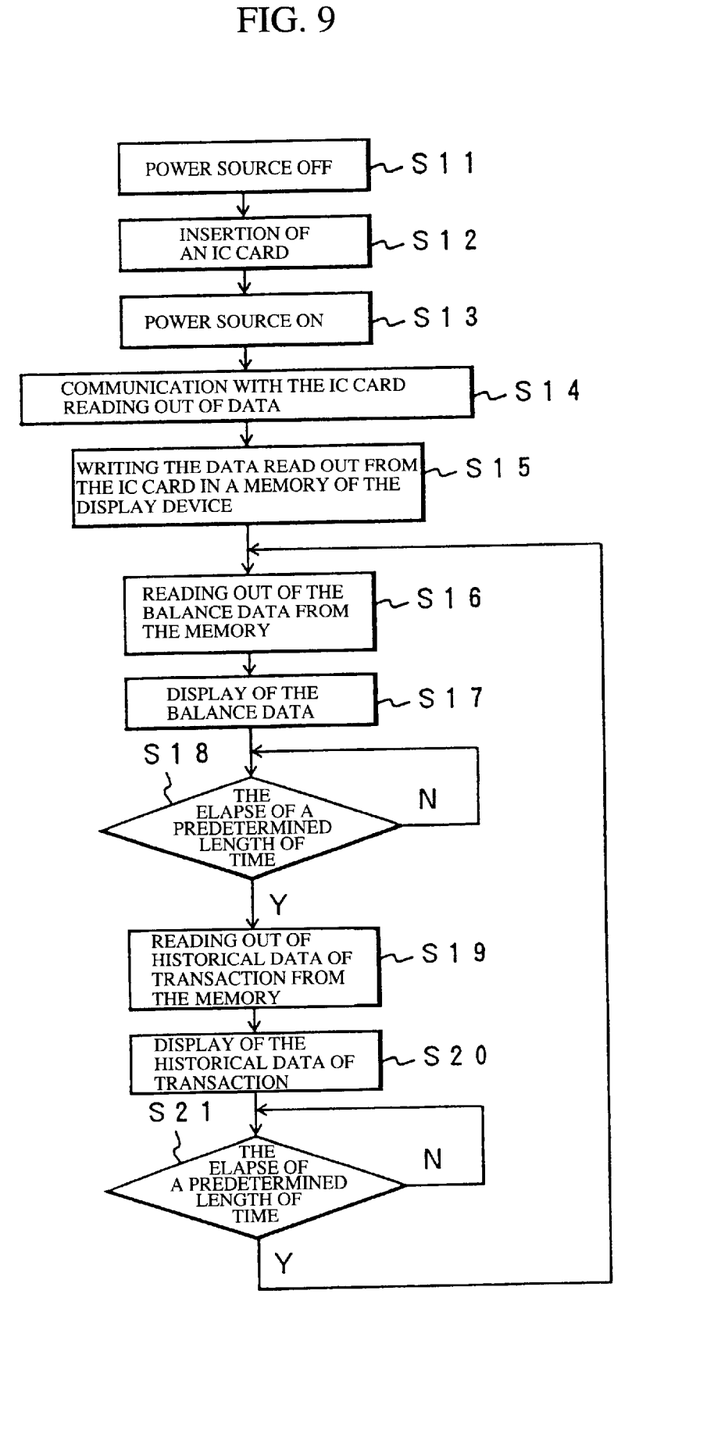
FIG. 9 is a flow chart of the IC card reader according to a variation of the embodiment of the invention.

Variations in many forms of the present embodiment may be carried out. For example, the IC card reader 1 may write in a memory (not shown) the balance data and the historical transaction data which are read out from the IC card 7, and read out the data from the memory, thus speeding up operation of displaying the balance data and the historical transaction data repeatedly. Display operation in such a variation of the present embodiment is described with reference to FIG. 9. FIG. 9 is a flow chart showing the display operation pattern of the IC card reader 1 according to the variation of the present embodiment. In the following description, the memory (not shown) stores the historical data of all transactions which are read out from the IC card 7; however, it may be altered to store the historical data of the last transaction only.

With the IC card reader 1 into which the IC card 7 is not inserted as yet, the power source is in an condition (step S11). When the bearer inserts (step S12) the IC card 7 into the insertion inlet 3 of the IC card reader 1, the front tip of the IC card 7 inpinges relationship an the internal wall of the switch 4c of the IC card reader 1, turning the switch 4c on. Hereupon, the card terminals of the IC card 7 are in contact with the connector 4b of the IC card reader 1. The controller 5 of the IC card reader 1, upon detecting that the switch 4c is on, decides that the insertion of the IC card 7 is complete (mounting of the IC card 7 is complete), and turns the power source 4a on (step S13). Then, the controller 5 communicates with the IC card 7 by controlling the IC card readout 6, reads out (step S14) the balance data and the historical transaction data stored in the memory 10 of the IC card 7, writes (step S15) a readout of the balance data and the historical transaction data in the memory (not shown), reads out (step S16) the balance data from the memory (not shown), and then displays (step S17) the readout of the balance data on the display window 2.

When the controller 5, measuring a display time for the balance data by means of the built-in timer, decides (step S18) that the display time has reached the predetermined length of time, the same reads out (step S19) a historical data of the last transaction among the historical data of all transactions stored in the memory (not shown), and displays (step S20) the readout of the historical data of the last transaction instead of the balance data on the display window 2. When the controller 5, measuring the display time for the historical transaction data by means of the built-in timer, decides (step S21) that the display time has reached a predetermined length of time, the steps of operation S16 and onwards as described above, are performed. More specifically, the balance data stored in the memory (not shown) are again read out, and a readout of the balance data instead of the historical transaction data is displayed in the display window 2. Thereafter, the controller 5 causes the IC card reader 1 to repeat the steps of operation from S16 to S21 until the IC card 7 is removed from the insertion inlet 3, displaying the balance data and the historical transaction data alternately in the display window 2.

When the bearer removes the IC card 7 from the insertion inlet 3 of the IC card reader 1, the switch 4c thereof is turned off, subsequently turning the power source 4a off.

(Another Embodiment 2)

Figure 10:
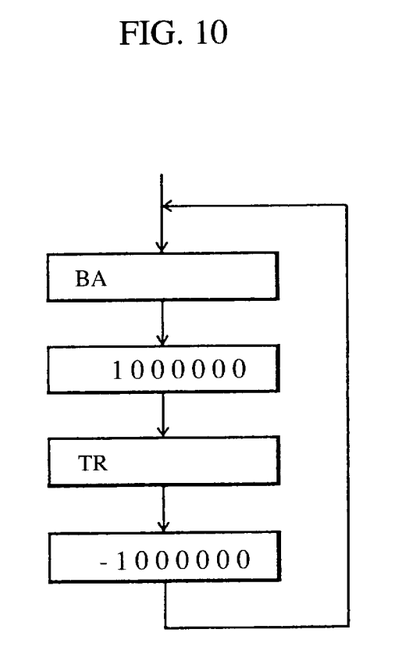
FIG. 10 is a view illustrating data displayed on the display window of the IC card reader according to the variation of the embodiment of the invention.
Figure 11:
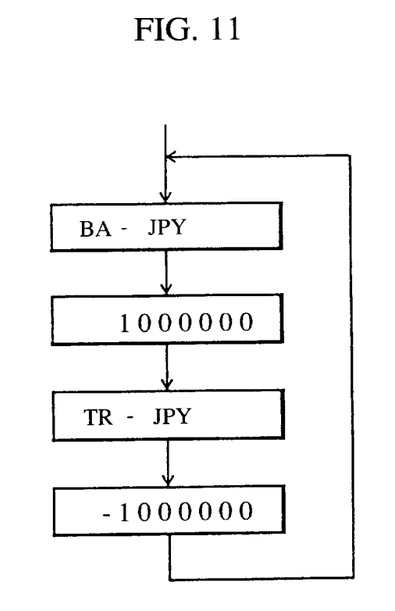
FIG. 11 is a view illustrating data displayed on the display window of the IC card reader according to the variation of the embodiment of the invention.

With an IC card reader 1 according to the present embodiment, when, for example, the number of digits of data to be displayed in the display window 2 is greater than the number of displayable digits in the display window 2, such data can be divided for display. This aspect is described hereafter with reference to FIGS. 10 and 11. FIGS. 10 and 11 are views showing the data displayed on the display window 2 in a case where the balance in the IC card 7 is 1,000,000 yen, and the historical data of the last transaction stored in the IC card 7 indicate 1,000,000 yen drawn out. In a display example shown in FIG. 10, the IC card reader 1 displays on the display window 2 "1000000" after displaying first "BA", and then "–1000000" after displaying first "TR", repeating such display operations. In an example of display as shown in FIG. 11, the IC card reader 1 displays on the display window 2 "1000000" after displaying first "BA-PY", and then "–1000000" after displaying first "TR-JPY", repeating such display operations. JPY denotes JAPAN YEN. Describing the aforesaid display operations in flow charts, the steps S16 and S17 in FIG. 9 correspond to the steps from S31 to S36 in FIG. 12, and the steps S19 and S20 in FIG. 9 correspond to the steps from S41 to S46 in FIG. 13. The steps from S31 to S 36 in FIG. 12 and the steps from S41 to S46 in FIG. 13 are described hereafter.

Figure 12:
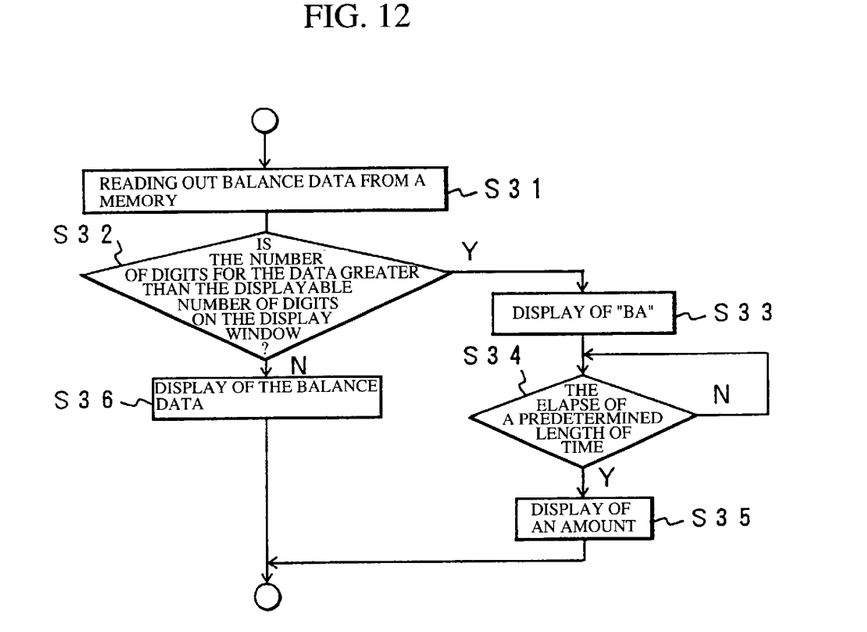
FIG. 12 is a flow chart of the IC card reader according to another variation of the embodiment of the invention.

In FIG. 12, the controller 5 reads out (step S31) the balance data stored in the memory (not shown), and decides (step S32) whether or not the number of digits for the balance data is greater than the number of digits displayable in the display window 2. Then, in a case of the number of digits for the balance data being greater than the number of digits displayable in the display window 2, the controller 5 causes the display window 2 to display (step S33) "BA". When the controller 5, measuring a display time for the balance data by means of the built-in timer, decides (step S34) that a predetermined length of time has elapsed, "1000000" is displayed (step S35) on the display window 2. On the other hand, when the controller 5 decides in the step S32 that the number of digits required by the balance data is smaller than the number of digits displayable in the display window 2, the controller 5 causes the display window 2 to display (step S36) "BA 1000000".

Figure 13:
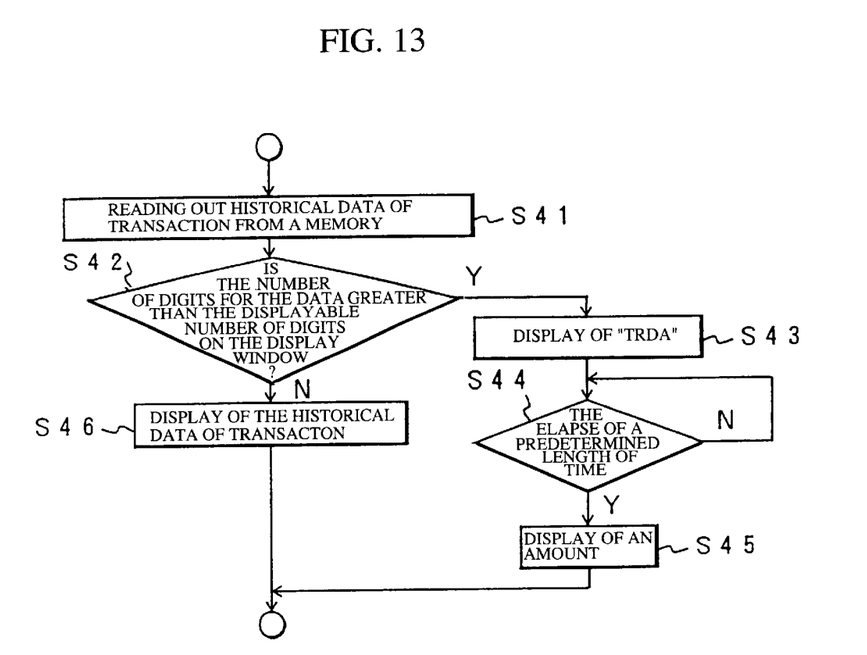
FIG. 13 is a flow chart of the IC card reader according to the aforesaid variation of the embodiment of the invention.

In FIG. 13, the controller 5 reads out (step S41) the historical data of the last transaction among the historical data of all transactions stored in the memory (not shown), and decides (step S42) whether or not the number of digits for the historical data of the last transaction is greater than the number of digits displayable in the display window 2. Then in a case of the number of digits for the historical data of the last transaction being greater than the number of digits displayable in the display window 2, the controller 5 causes the display window 2 to display (step S43) "TRDA" (hereinafter TRDA refers to the historical data of the last transaction). When the controller 5, measuring a display time for the historical transaction data by means of the built-in timer, decides (step S44) that the display time has reached a predetermined length of time, "–1000000" is displayed (step S45) in the display window 2. On the contrary, in a case of the number of digits for the historical data of the last transaction being smaller than the displayable number of digits on the display window 2, the controller 5 causes the display window 2 to display (step S46) "TRDA–1000000".

(Another Embodiment 3)

Figure 14:
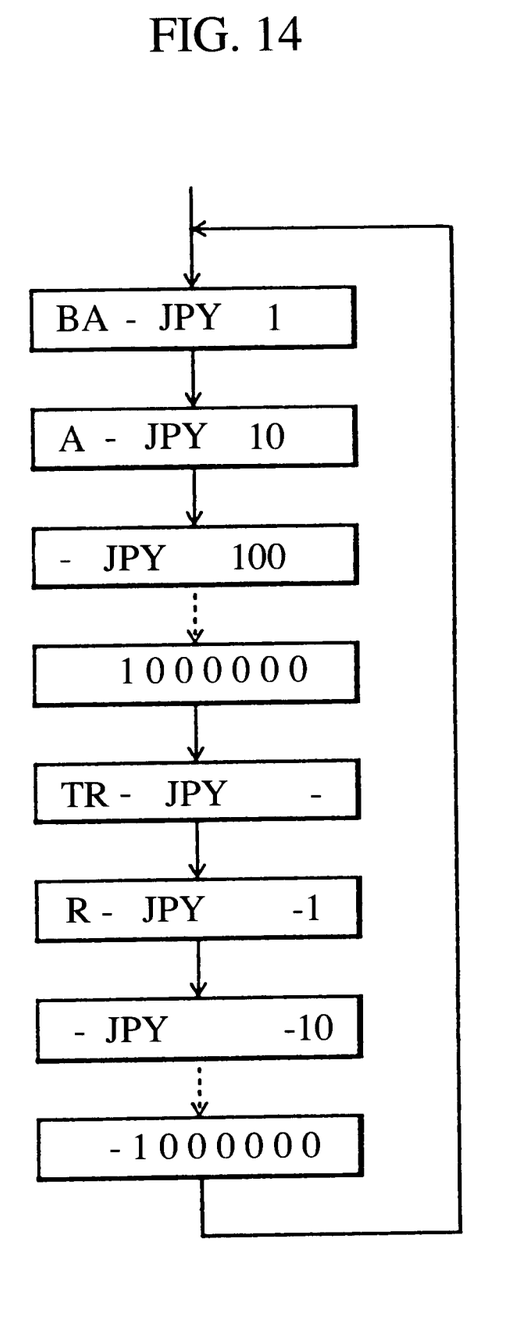
FIG. 14 is a view illustrating data displayed on the display window of the IC card reader according to a further variation of the embodiment of the invention.

With an IC card reader 1 according to the present embodiment, when, for example, the number of digits of data to be displayed in the display window 2 is greater than the displayable number of digits in the display window 2, such data can be scrolled for display. This aspect is described hereafter with reference to FIG. 14. FIG. 14 is a view showing the data displayed on the display window 2 in a case where the balance in the IC card 7 is 1000000 yen, and the historical data of the last transaction stored in the IC card 7 indicate 1000000 yen drawn out. The IC card reader 1 displays in the display window 2 the data to be displayed, to an extent of the displayable number of digits, that is, "BA-JPY 1" only at first among the data such as "BA-JPY 1000000" and "TR-JPY –1000000". Thereafter the IC card reader 1 displays the data such that each character of the data in the display window disappears in sequence from one extremity on the left hand side of the display window, and new characters of the data appear one by one in sequence from the other extremity on the right hand side. Thus, the IC card reader 1 display part of the data at a time in the display window 2, in the following order: "A-JPY 10", "–JPY 100", "JPY 1000", "PY 10000", "Y 100000", "1000000", "1000000", "000000", "00000", "0000", "000", "00", and "0". Thereafter, the IC card reader 1 displays part of the data partially at a time in the display window 2 "TR-PY –" first, and continues to provide a display in a manner similar to the above, in the following order: "R-JPY –1", "–JPY –10", "JPY –100", "PY –1000", "Y –10000", "–100000", "–1000000", "1000000", "000000", "00000", "0000", "000", "00", and "0". The IC card reader 1 displays the balance data and the historical transaction data alternately in the display window 2 by a performing display operation in a manner as described above. Further, when the data on display is changed over from the balance data to the historical transaction data and vice versa, scrolling is put on hold for a predetermined length of time, for example, about one second, to enable the bearer to watch the data with ease. Showing the aforesaid display operations in flow charts, the steps S16 and S17 in FIG. 9 correspond to the steps from S51 to S57 in FIG. 15, and the steps S19 and S20 in FIG. 9 correspond to the steps from S61 to S67 in FIG. 16. The steps from S51 to S57 in FIG. 15 and the steps from S61 to S67 in FIG. 16 are described hereafter.

Figure 15:
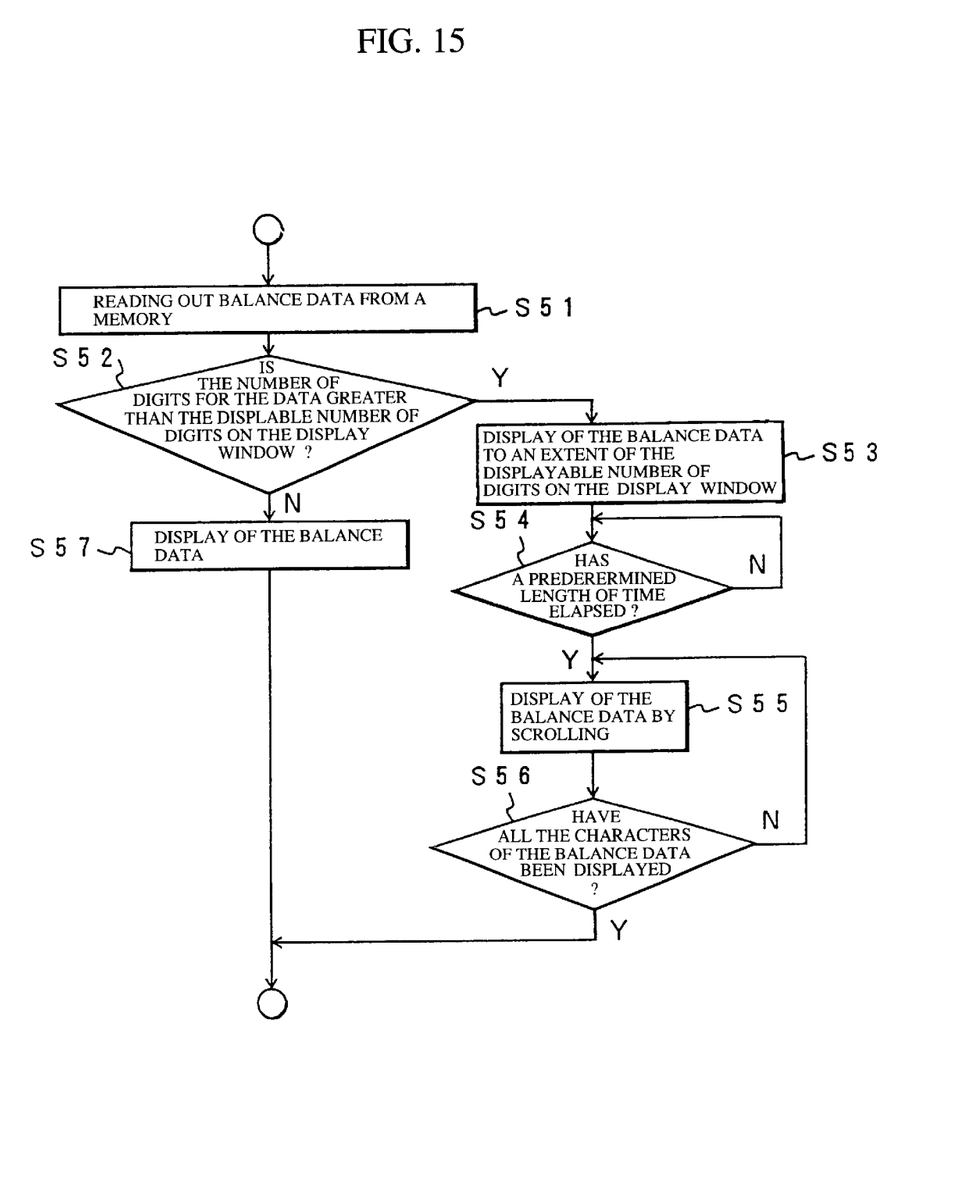
FIG. 15 is a flow chart of the IC card reader according to the further variation of the embodiment of the invention.

In FIG. 15, the controller 5 reads out (step S51) the balance data stored in the memory (not shown), and decides (step S52) whether or not the number of digits for the balance data is greater than the number of digits displayable in the display window 2. Then, in a case of the number of digits for the balance data being greater than the number of digits displayable in the display window 2, the controller 5 causes the display window 2 to after first display (step S53) the data to an extent of the number of digits displayable in the display window 2 at first, that is, "BA-JPY 1". When the controller 5, measuring a display time for the balance data by means of the built-in timer, decides (step S54) that the display time has reached a predetermined length of time, a portion of the balance data appearing in the display window 2 is scrolled sideways to the left for displaying the remainder (step S55). Hereupon, characters of the balance data, in places beyond the displayable number of digits, come into view one by one in sequence from the extremity on the right hand side of the display window. The controller 5 causes the balance data to be displayed in the display window 2 by scrolling the same until all the characters of the balance data are displayed (step S56). On the contrary, in a case of the number of digits for the balance data being smaller than the number of digits in the display window 2, the controller 5 causes the display window 2 to display "BA-JPY 1000000" (step S57) at a single time.

Figure 16:
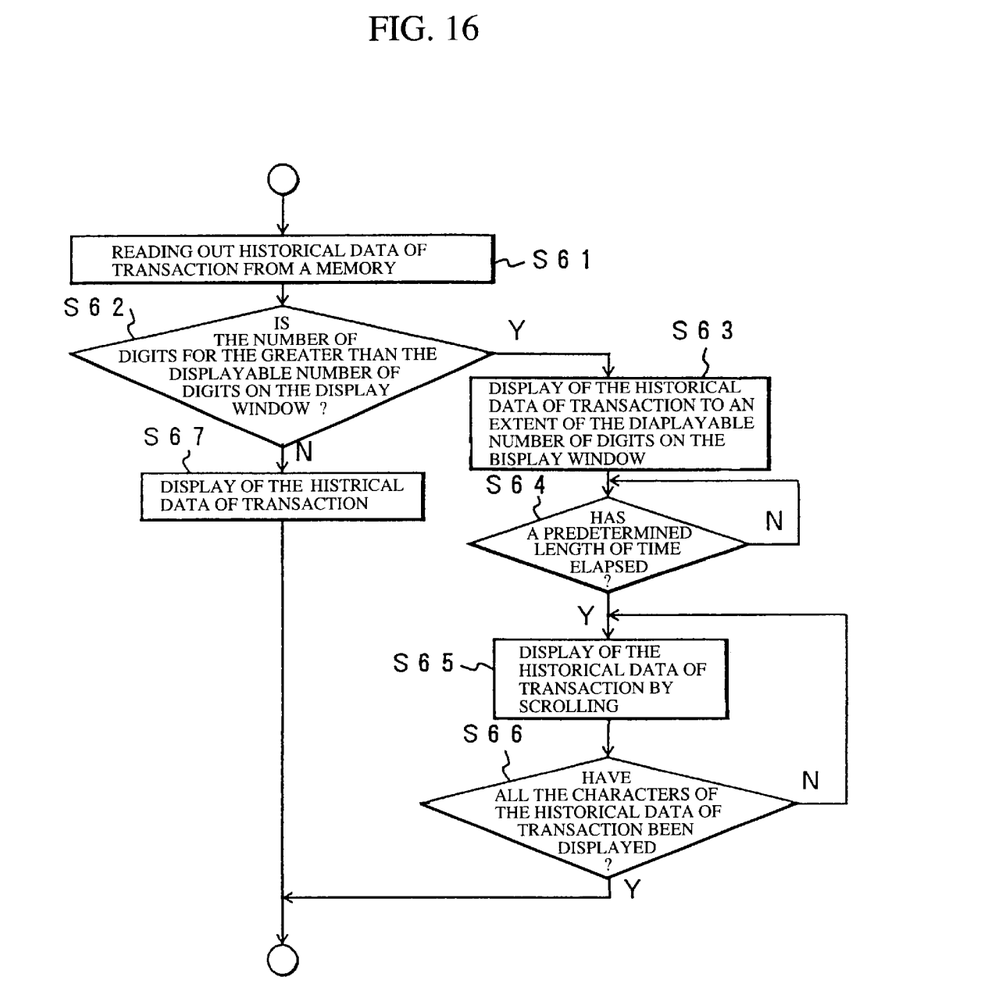
FIG. 16 is a flow chart of the IC card reader according to the further variation of the embodiment of the invention.

In FIG. 16, the controller 5 reads out (step S61) the historical data of transaction stored in the memory (not shown), and decides (step S62) whether or not the number of digits for the historical transaction data is greater than the number of digits displayable in the display window 2. In case of the number of digits for the historical transaction data being found to be greater than the number of digits displayable in the display window 2, the controller 5 causes the display window 2 to display the data to an extent of the displayable number of digits at first, that is, "TR-JPY –" (step S63). When the controller 5, measuring a display time for the historical transaction data by means of the built-in timer, decides (step S64) that the display time has reached a predetermined length of time, the historical transaction data appearing on the display window 2 is scrolled sideways to the left for displaying the remainder (step S65). Hereupon, characters of the historical transaction data, in places beyond the displayable number of digits, comes into view one by one in sequence from the extremity on the right hand side of the display window. The controller 5 causes the historical transaction data to be displayed on the display window 2 by scrolling the same until all the characters of the balance data are displayed (step S66). On the contrary, in a case of the number of digits for the historical transaction data being found to be smaller than the number of digits displayable in the display window 2 in the step S62, the controller 5 causes the display window 2 to display "TR-JPY 1000000" at a single time (step S67).

Figure 17:
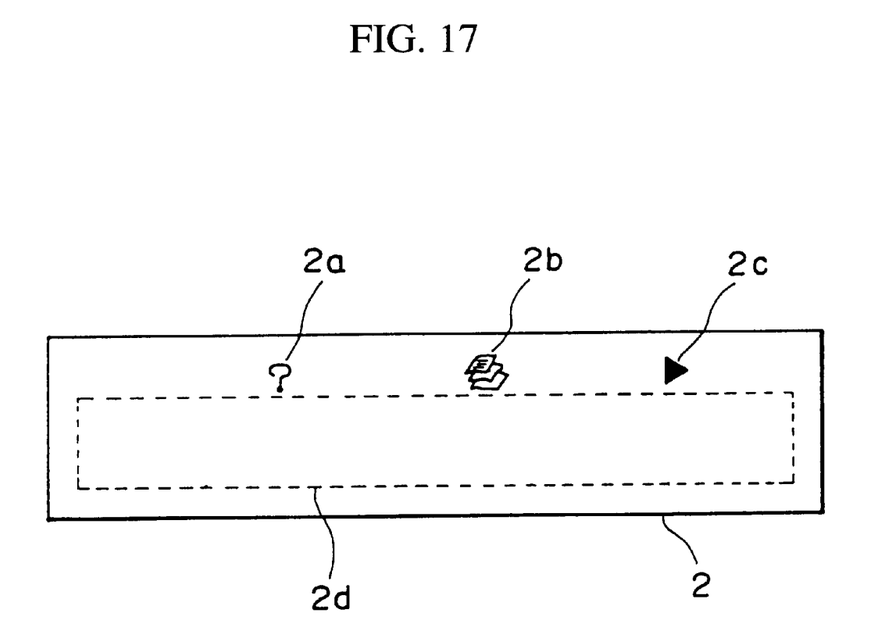
FIG. 17 is a top plan view showing a display window of the IC card reader according to an even further variation of the embodiment of the invention.

Furthermore, the prefix of the data displayed on the display window 2 such as "BA" or "TR" may be substituted by other specific markings. For example, in FIG. 17, 2a is a marking denoting the balance, 2b a marking denoting the historical data of transaction, and 2c a marking indicating the data being scrolled. The aforesaid markings 2a, 2b, and 2c may be constituted so as to be either lit up or put out. A marking 2d denotes a character display area where characters other than the markings 2a, 2b, and 2c are displayed. For example, the balance data can be displayed by lighting up the marking 2a and displaying an amount in the character display area 2d of the display window 2. Also in case where all the data can not be displayed at once in the character display area 2d, the same can still be displayed by lighting up the marking 2c and scrolling the data in the character display area 2d. The IC card reader 1 provided with the display window 2 constituted as above is capable of displaying data of maximum volume without division thereof on one screen.

(Another Embodiment 4)

With the IC card reader 1 according to the aforesaid embodiments, the balance data and the historical data of the last transaction are displayed in turn. However, the display pattern as described in the foregoing may be varied so as to display in turn the balance data and the historical data of all transactions stored in the IC card 7. Or the display pattern of the IC card reader 1 may be varied so as to display in turn the balance data and the historical data of a predetermined number of transactions, for example, ten transactions repeatedly.

Further, the aforesaid display pattern of the IC card reader 1 may be varied in diverse ways. For example, the display pattern may be varied so as to display repeatedly the balance data in combination with the historical data of transaction such as "1000 yen paid in on December 2 and the balance at present is 5000 yen". Further, the display pattern may be varied so as to display in turn the balance data such as "the balance at present 5000 yen" and the balance data in combination with the historical transaction data such as "1000 yen paid in on December 2 and the balance at present is 5000 yen" repeatedly. Furthermore, the specification of characters used in the display pattern may be varied to correspond to local languages so that, for example, Kanji, the Hunkul alphabet, and the like may be included in the characters. In addition, the display pattern may be varied so as to display US$ denoting United States-Dollar or FFR denoting France-Franc instead of JPY denoting Japan-Yen.

In the present embodiments, the IC card reader 1 for handling the IC card provided with the card terminals is described by way of example. However, the present embodiments of the invention may be carried out with the IC card reader for handling an IC card not provided with the card terminals.

In the present embodiments, the insertion inlet 3 is formed in the IC card reader 1, and the IC card 7 is mounted in or removed from the insertion inlet 3. However, the IC card reader 1 may be constructed such that the upper part thereof including the substrate 4 can be opened and closed freely instead of forming the insertion inlet 3 therein, enabling the IC card reader 1 to turn the switch 4c on as soon as the card terminals come in contact with the connector 4b by opening the upper part of the IC card reader 1, mounting the IC card 7 therein, and then closing the upper part.

In the present embodments, the IC card reader for handling a prepaid IC card is described by way of example. However, the invention may be applied to an IC card reader for handling, for example, a credit card instead of the IC card, and capable of displaying a total amount of purchases made as a result of the last transaction, and the historical data of the last transaction as described in the foregoing by mounting the credit card therein.

In the present embodiments, the IC card reader 1 may be constituted so as to display the balance data only without displaying the historical data of transaction in case where satisfactory display is not possible due to depletion of the power source, subsequently turning the power source 4a off.

Furthermore, the IC card reader 1 may be constituted so as to give the bearer of the IC card a warning in a case of the IC card 7 being inserted into the insertion inlet 3 in a reverse direction. For example, the IC card reader 1 may be constituted so as to display a sign in the display window 2, indicating, for example, "CHECK INSERTION DIRECTION OF IC CARD" in case that no responsive signal is transmitted by the IC card 7 within a predetermined length of time after the insertion of the IC card 7 into the insertion inlet 3 is detected by means of the switch 4c.

The IC card reader 1 according to the present embodiments may be provided with a power generation unit capable of generating power by simply swinging like a watch, and the like or a solar cell so that the power source 4a can be recharged.

(Effects of the Invention)

As described in detail in the foregoing, the display device according to the invention is constituted so as to read out the balance data and the historical transaction data from the IC card as soon as the mounting of the IC card is detected by the card detection sensor, and to display the respective data alternately in the display window. The display device according to the invention is made compact in size as a result of dispensing with the keyboard, and the like as in the case of conventional display devices, and yet capable of displaying both the balance data and the historical transaction data. Consequently, the display device according to the invention is quite handy for the bearer of the IC card to use because it is no longer necessary for him to calculate an amount of the electronic money transferred corresponding to the price of a purchase made at a shop by checking the balance of the electronic money before and after a transfer.

What is claimed is:

1. A portable display device for displaying data read out from an IC card, on a display window, said device comprising:
   a switch; and
   a controller, responsive to operation of only the switch, for reading out balance data and historical data of a transaction from the IC card, and for alternatingly displaying the balance data and the historical data in the display window, at intervals of a predetermined length of time.

2. A portable display device according to claim 1, further comprising a card receptacle for receiving and retaining the IC card therein, wherein said switch includes a card detecting sensor that detects mounting and removal of the IC card in and out of the card receptacle and wherein said operation of the switch includes the detecting by the sensor.

3. A portable display device for displaying data read out from an IC card, in a display window, the device comprising:
   an IC card receptacle for removably receiving and retaining an IC card;
   a detection sensor for detecting the presence of an IC card in the receptacle; and
   a controller, responsive only to detection by the detection sensor of the presence of an IC card in the receptacle, for reading out both balance data and historical data of a transaction from the IC card and for alternatingly displaying the balance data and the historical data in the display window, at intervals of a predetermined length of time.

4. A portable display device for displaying data read out from an IC card, in a display window, the device comprising:
   an IC card receptacle for removably receiving and retaining an IC card;
   a detection sensor for detecting the mounting and removal of an IC card respectively in and from the receptacle; and
   a controller, responsive only to detection by the detection sensor of mounting of an IC card in the receptacle, for reading out both balance data and historical data of a transaction from the IC card, and for alternatingly displaying the balance data and the historical data in the display window, at intervals of a predetermined length of time, and responsive to detection by the detection sensor of removal of the IC card from the receptacle, for discontinuing the displaying the balance data and the historical data.

\* \* \* \* \*